United States Patent
Wu et al.

(10) Patent No.: US 11,055,085 B2
(45) Date of Patent: Jul. 6, 2021

(54) METHOD, APPARATUS, AND SYSTEM FOR HOT-DEPLOYING APPLICATION

(71) Applicant: BANMA ZHIXING NETWORK (HONGKONG) CO., LIMITED, Kowloon (HK)

(72) Inventors: Fengyuan Wu, Hangzhou (CN); Ning Li, Hangzhou (CN); Xiaofen Qin, Hangzhou (CN); Liangqin Fan, Hangzhou (CN)

(73) Assignee: BANMA ZHIXING NETWORK (HONGKONG) CO., LIMITED, Hong Kong (HK)

(*) Notice: Subject to any disclaimer, the term of this patent is extended or adjusted under 35 U.S.C. 154(b) by 0 days.

(21) Appl. No.: 16/041,082

(22) Filed: Jul. 20, 2018

(65) Prior Publication Data
US 2019/0138297 A1   May 9, 2019

Related U.S. Application Data

(63) Continuation-in-part of application No. PCT/CN2017/070986, filed on Jan. 12, 2017.

(30) Foreign Application Priority Data

Jan. 21, 2016  (CN) .......................... 201610041657.1

(51) Int. Cl.
*G06F 8/656* (2018.01)
*G06F 16/18* (2019.01)
*G06F 16/958* (2019.01)

(52) U.S. Cl.
CPC .......... *G06F 8/656* (2018.02); *G06F 16/1873* (2019.01); *G06F 16/958* (2019.01)

(58) Field of Classification Search
None
See application file for complete search history.

(56) References Cited

U.S. PATENT DOCUMENTS

| 5,473,772 A | 12/1995 | Halliwell |
| 6,591,266 B1* | 7/2003 | Li .................. G06F 16/9574 |

(Continued)

FOREIGN PATENT DOCUMENTS

| CN | 102402427 A | 4/2012 |
| CN | 103902319 A | 7/2014 |

(Continued)

OTHER PUBLICATIONS

Google, Interface Loading, 2020, https://guava.dev/releases/19.0/api/docs/com/google/common/cache/LoadingCache.html (Year: 2020).*

(Continued)

*Primary Examiner* — Hossain M Morshed
(74) *Attorney, Agent, or Firm* — Van Pelt, Yi & James LLP

(57) ABSTRACT

Embodiments of the present application disclose a method, device, and system for application hot deployment. The method includes determining, by one or more processors associated with a terminal, that a data resource is updated, and in response to determining that the data resource is updated, obtaining, by the one or more processors, an updated data resource, and updating a page displayed by a browser on the terminal, wherein the data resource is used in connection with the page being rendered, and the updating being based at least in part on the updated data resource.

26 Claims, 7 Drawing Sheets

(56) References Cited

U.S. PATENT DOCUMENTS

| | | | |
|---|---|---|---|
| 6,915,513 B2 | 7/2005 | Duesterwald | |
| 7,886,287 B1 | 2/2011 | Davda | |
| 7,975,019 B1* | 7/2011 | Green | G06Q 30/0631 709/217 |
| 9,052,908 B2* | 6/2015 | Fu | G06F 8/38 |
| 9,317,616 B1* | 4/2016 | Yates | H04L 67/02 |
| 9,348,938 B2* | 5/2016 | Murphy | H04L 67/02 |
| 9,459,856 B2* | 10/2016 | Curzi | G06F 8/65 |
| 2005/0246702 A1 | 11/2005 | Yeh | |
| 2007/0006320 A1* | 1/2007 | Paul | G06Q 20/40 726/27 |
| 2007/0288488 A1* | 12/2007 | Rohrs | G06F 16/958 |
| 2008/0109327 A1* | 5/2008 | Mayle | G06Q 30/0603 705/27.1 |
| 2008/0177858 A1* | 7/2008 | Aarnio | G06F 16/9562 709/217 |
| 2009/0282396 A1 | 11/2009 | Boyer | |
| 2011/0113424 A1* | 5/2011 | Ewington | G06F 8/658 717/178 |
| 2011/0214113 A1 | 9/2011 | You | |
| 2013/0167014 A1* | 6/2013 | Gabara | G06F 3/0482 715/240 |
| 2014/0281914 A1 | 9/2014 | Sakawaki | |
| 2014/0351807 A1* | 11/2014 | Wen | H04L 67/02 717/173 |
| 2014/0379841 A1* | 12/2014 | Zong | H04L 67/2842 709/213 |
| 2015/0088968 A1* | 3/2015 | Wei | H04L 67/2823 709/203 |
| 2017/0201417 A1* | 7/2017 | Gupta | H04L 61/1511 |
| 2017/0249141 A1 | 8/2017 | Parees et al. | |

FOREIGN PATENT DOCUMENTS

| | | |
|---|---|---|
| CN | 104102502 A | 10/2014 |
| CN | 104809016 A | 7/2015 |

OTHER PUBLICATIONS

TechTerms, "Page Layout", 2020, https://techterms.com/definition/page_layout (Year: 2020).*

Guava. "CachesExplained", 2020, https://github.com/google/guava/wiki/CachesExplained (Year: 2020).*

Newman, "Beginner's Guide to Techniques for Refreshing WebPages: Ajax, Comet, HTML5", 2012, Published at https://richnewman.wordpress.com/2012/09/08/beginners-guide-to-techniques-for-refreshing-web-pages-ajax-comet-html5/ (Year: 2012).*

* cited by examiner

METHOD, APPARATUS, AND SYSTEM FOR HOT-DEPLOYING APPLICATION

CROSS REFERENCE TO OTHER APPLICATIONS

This application is a continuation-in-part of and claims priority to International (PCT) Application No. PCT/CN2017/70986 entitled METHOD, APPARATUS, AND SYSTEM FOR HOT-DEPLOYING APPLICATION, filed Jan. 12, 2017 which is incorporated herein by reference for all purposes, which claims priority to China Application No. 201610041657.1 entitled AN APPLICATION HOT DEPLOYMENT METHOD, DEVICE, AND SYSTEM, filed Jan. 21, 2016 which is incorporated herein by reference for all purposes.

FIELD OF THE INVENTION

The present application relates to the field of communication technology. In particular, the present applications relates to a method, system, and device for hot deployment of an application.

BACKGROUND OF THE INVENTION

As communication technology develops, an increasing number of Internet applications based on mobile terminals is developed to satisfy the ever-increasing and diversified demand for services.

JavaScript (JS) is a script that runs on a browser, and is typically used for front-end programming of the browser. Node.js is a platform established based on Chrome JavaScript runtime. Node.js is generally used to facilitate the development of network applications with fast response rates and that can be easily scaled. Node.js uses event-driven architecture, and is suitable for running data-intensive real-time applications on distributed devices. Node is the JavaScript operating environment (runtime).

Hot application deployment refers to the upgrading of software while an application is running without requiring the application to be restarted. For example, hot application deployment includes upgrading the software for an application while that application is running. According to related art, server-based JavaScript hot deployment methods generally include the following steps: (1) starting the Node.js server, and loading normal js files; (2) starting a service to uninstall js files; (3) maintaining js file life cycle; (4) upgrading js files; and (5) monitoring program operation. A js file is used to provide a function. For example, a js file can be deemed an application module. One js file generally comprises multiple program (code) segments. The hot deployment method can be performed by the server. For example, steps 1-4 of the hot deployment method described above can be performed by a server. A code segment (or program segment) corresponds to a portion of an object file. The code segment generally comprises one or more executable instructions. A code segment (or program segment) can be a piece of code used for a function. An example of a code segment is:

```
const curry = (fn, arity = fn.length,
    arity <= args.length
        ? fn(...args)
        : curry.bind(null, fn, arity, ...
// curry(Math.pow)(2)(10) -> 1024
// curry(Math.min,3)(10)(50)(2) -> 2
```

Current hot deployment solutions for Internet applications are typically directed to an application module or file, which serves as the smallest resource unit that is updated or synchronized. However, the amount of data in application modules or files is relatively large, which therefore results in greater granularity of the updated or synchronized resources, thus creating greater delays in updating or synchronization, which can then lead to an inability to promptly synchronize the client and server in Internet applications.

In view of the above, there is a need for a hot deployment scheme that overcomes the deficiencies described above.

BRIEF DESCRIPTION OF THE DRAWINGS

Various embodiments of the invention are disclosed in the following detailed description and the accompanying drawings.

DETAILED DESCRIPTION

Figure 1:
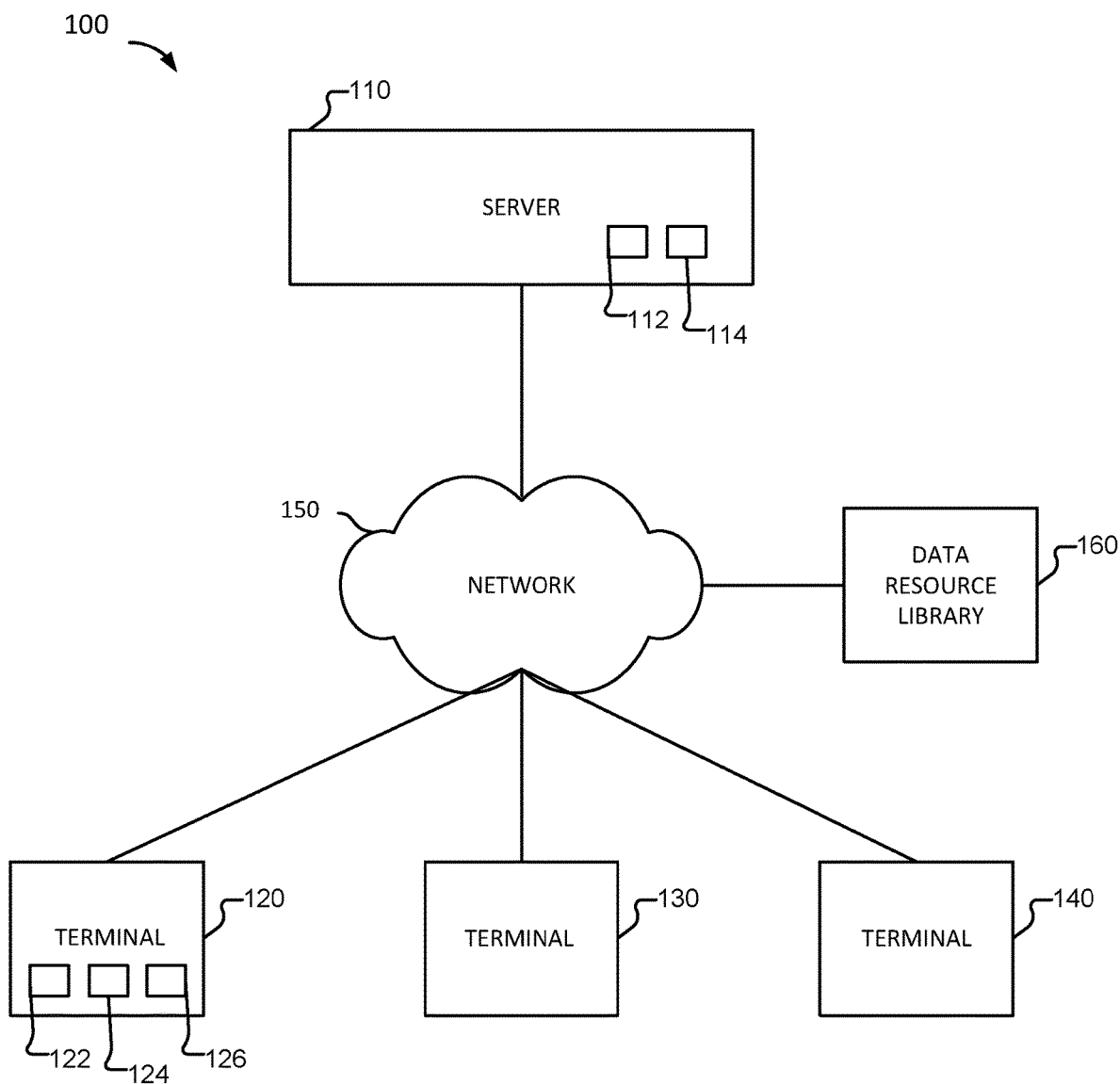
FIG. 1 is a structural diagram of a system for hot application deployment according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a terminal generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, information centers (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HIVID), electronic clothes, electronic braces, an electronic necklace, an electronic accessory, an electronic tattoo, or a smart watch), a kiosk such as a vending machine, a smart home appliance, vehicle-mounted mobile stations, or the like. A terminal can run various operating systems.

In some embodiments, a "smart terminal" is a terminal device having multimedia functions. A smart terminal supports audio, video, data, and other such functions. The smart terminal can have a touchscreen. The smart terminal can correspond to a smart mobile device such as a smart phone, a tablet computer, or a smart wearable device, or a smart television, personal computer, or other such device with a touchscreen. Various operating systems such as Android, iOS, YunOS, and tvOS can be implemented on the smart terminal. Various embodiments discussed herein are in the context of the example of a television device using tvOS; however, other types of terminals or operating systems can be used. A smart terminal can be connected to one or more networks such as the Internet, a WiFi network, a Local Area Network (LAN), a Wide Area Network (WAN), a telecommunications network, etc.

A smart terminal can be connected to one or more peripherals (e.g., smart peripherals). For example, the smart terminal can be connected to one or more peripherals via a Bluetooth connection, a WiFi direct connection, an infrared connection, a ZigBee connection, a Bluetooth Low Energy (BLE) connection, a WiMax connection, a Low Power Radio (LPR) connection, a Near Field Communications (NFC) connection, etc.

According to various embodiments, resource synchronization is reduced based on a size of a data resource being smaller. For example, use of smaller data (e.g., smaller data segments) in connection with synchronization enables synchronization to be performed (e.g., completed faster). Conventional art generally uses an application module or application file as a resource unit that is synchronization. Accordingly, the granularity or size of data being synchronized according to the conventional art is greater than various embodiments. For example, in some embodiments, the data resources are smaller than an application module or an application file.

FIG. 1 is a structural diagram of a system for hot application deployment according to various embodiments of the present application.

Referring to FIG. 1, system 100 for hot application deployment is provided. System 100 can implement process 200 of FIG. 2, process 300 of FIG. 3, process 400 of FIG. 4, and/or process 500 of FIG. 5. System 100 can be implemented, at least in part, by terminal 600 of FIG. 6 and/or computer system 700 of FIG. 7.

As illustrated in FIG. 1, system 100 comprises server 110 and one or more terminals (e.g., terminals 120, 130, and 140). The one or more terminals can comprise a client device. In some embodiments, at least one of the one or more terminals has an application running thereon. The application running on the at least one of the one or more terminals can be updated in connection with a hot application deployment. After a hot application deployment on the server, an application on a terminal can be updated accordingly. Server 110 and the one or more terminals can communicate over network 150.

According to various embodiments, an application is installed on a client device such as at least one of the one or more terminals. The application installed on the terminal can be an Internet application client program, and an Internet application server program is installed on server 110. The Internet application client program and the Internet application server program can provide information to one another (e.g., via communication between server 110 and the terminal over network 150). In some embodiments, the terminal and server 110 work together. For example, the terminal can obtain data resources to be used in connection with (e.g., by) the Internet application client program. The terminal can obtain the data resources to be used for the Internet application (e.g., the Internet application client program) from server 110. The data resources obtained by the terminal can correspond to data resources that are needed by the Internet application client program to realize the services provided by the Internet application. In some embodiments, server 110 provides an address corresponding to a location from which the data resource can be obtained (e.g., a location of a network storage, etc.).

The terminal and the server can communicate information over one or more networks 150. Network 150 can be a wide area network, a local area network, or the Internet, or the Internet using mobile communication technology. As an example, the terminal can connect to the Internet wirelessly, and the server typically connects to the Internet via a wired connection.

In some embodiments, the terminal and the server can employ cloud computing technology, using the powerful functions of cloud-based computing to realize information processing. The server and terminal can implement an operating system based on cloud computing, such as YunOS, thereby integrating cloud and client resources and services.

In some embodiments, data resources refer to data and/or program code associated with an application such as an Internet application. The data resources can correspond to the data and/or program code needed for an Internet application to operate. In some embodiments, the data resources comprise webpage elements and/or code segments that are subcomponents of a webpage. As an example, webpage elements comprise: one or more of the following: text, images, audio files, animations, or video files used in connection with webpage display. As another example, code segments comprise one or more of JavaScript program code, CSS (cascading style sheet) code, or program code the webpage uses (e.g., requires) to implement specific functions (e.g., certain dynamic functions or patch functions). According to various embodiments, based on JS technology, modules can be coded as script and which be implemented with hot deployment. Conventional art merely updates an application module or a file and does not update sources having smaller granularity such as an object or element used by an application module or a file. According to various embodiments, smaller granularity updates are implemented in contrast to conventional art. In some embodiments, if only a part of a page such as a code segment is to be updated, a reference to a line number or offset is included. For example the code segment can be associated with (or comprise) a line number of offset. The line number or offset can be used in connection with determining a location at which to perform an update. For example, the browser can determine to put the updated portion based on the line number or offset.

According to various embodiments, in response to determining that a data resource is updated (e.g., in response to detecting an updated data resource), the page displayed by the browser is updated based on the updated data resource. Because the granularity of data resources is smaller than that of application modules or files, in comparison to the conventional art, various embodiments implement data resource synchronization (e.g., updating of data resources) with finer granularity, thereby enabling the resource synchronization (e.g., updating of data resources) delay to be reduced. According to various embodiments, in response to determining that a data resource is updated (e.g., in response to detecting an updated data resource), the page can be updated (e.g., immediately) based on the updated data resource, thus further reducing the resource synchronization delay, and improving the user experience.

One or more of terminals 120-140 establish a connection with the server 110 via network 150. The one or more terminals 120-140 establish the connection with the server 110 in connection with providing Internet functionality such as via an application (e.g., an Internet application) installed on the one or more terminals 120-140. The one or more terminals 120-140 are configured to maintain the connection with the server 110. For example, the one or more terminals 120-140 can use a heartbeat messaging method to maintain the validity of the connection between the one or more terminals 120-140 and the server 110. The connection between the one or more terminals 120-140 and the server 110 can be used to exchange information between the one or more terminals 120-140 and the server 110. For example, the data resources can be exchanged between the one or more terminals 120-140 and the server 110 across the connection there between. The connection between the one or more terminals 120-140 and the server 110 can be transmission control protocol (TCP)-based or user datagram protocol (UDP)-based. The connection can be implemented using various other communication protocols.

According to various embodiments, a terminal determines that updated data resources are available. The terminal can determine that updated data is available based on an update notice provided to the terminal from the server, or the terminal request the server for an indication whether any updated data resources area available. For example, the terminal detects the presence of updated data resources. Data resources can be updated in connection with inclusion of new functions (e.g., new application functionality), bug fixes, etc. In response to determining that the updated data resources are available (e.g., in response to detecting an updated data resource), the terminal obtains the updated data resource. The terminal can update the page displayed by the browser of the terminal based on the updated data resource.

In some embodiments, the terminal polls or pulls the server 110 for updated data resources. For example, the terminal determines whether updated data resources are available based on a pulling message communicated to the server 110. The terminal can send a query to the server for updated data resources. For example, the terminal can send the query for updated data resources based on a predefined schedule, or at threshold intervals.

In some embodiments, the terminal determines that updated data resources are available based on information pushed to the terminal from/by the server 110. For example, the server 110 can push the updated data resources to the terminal. As another example, the server 110 can push information to the terminal, the information indicating that updated data resources are available. The server 110 can push the updated data resources (or information pertaining thereto) to the terminal in response to updating the data resources, or in response to determining that the data resources have been updated (e.g., in response to the updated data resources being generated).

As an example, the terminal can be implemented by software; for example, the terminal can specifically be the functional modules integrated on the one or more terminals 120-140 illustrated in FIG. 1. As another example, the terminal can be implemented by a combination of software and hardware. The terminal can be a mobile terminal or smart terminal device.

According to various embodiments, the server 110 communicates updated data resources (or information pertaining thereto) to the one or more terminals 120-140. For example, the server 110 pushes the updated data resources to the terminal. The server can push the updated data resources in response to a determination that updated data resources are available (e.g., in response to a determination that the data resources are updated). The server can determine whether updated data resources are available at preset time intervals, etc. In some embodiments, the server 110 obtains (e.g., receives) data resource update requests sent by the terminal.

In some embodiments, the data resource update request corresponds to an inquiry as to whether a data resource has been updated.

In some embodiments, the data resource update request corresponds to a request to update a data resource (e.g., at the server side). For example, the terminal provides information or data with which to update the data resource at the server side. The data resource can be stored locally at the server or at a storage that is remote to the server (e.g., on a network storage or other server, etc.). The data resource update request can comprise a data resource updated by the terminal (e.g., by an application running on the terminal). In response to receiving the data resource update request, the server 110 can respond to the data resource update request. For example, the server 110 can accept the request to update the data resource. As another example, the server 110 can deny the request to update the data resource. In response to receiving the data resource update request, the server 110 can update the version number of the data resource. For example, the server 110 can store a new or updated version of the data resource. The data resource can have a corresponding version number associated therewith. If the data resource is updated, a new version number can be created or otherwise associated with the data resource.

According to various embodiments, the terminal comprises one or more of: a detection module, a deployment module, and a browser module. As illustrated in FIG. 1, terminal 120 can comprise detection module 122, deployment module 124, and browser module 126.

The detection module can be configured to detect the presence of updated data resources. The detection module can determine whether a data resource has been updated. For example, the detection module can determine whether a data resource stored locally at the terminal has been updated.

The deployment module of the terminal can be configured to update a display base on an updated data resource. For example, in response to determining that a data resource has been updated (e.g., that updated data resources are available), the deployment module can update a display (or cause a display to be updated) based on updated data resources. The deployment module can instruct the browser module to update the displayed page. The instruction to the browser module to update the display page can comprise one or more of an indication of an updated data resource with which the display is to be updated, the presence or availability of an updated data resource, a location of the updated data resource, etc.

The browser module of the terminal can be configured to update the page displayed by the browser based on the updated data resource. The browser module can update the page displayed by the browser in response to receiving an instruction from the deployment module to update the displayed page. The browser module can be a browser engine, such as an engine modified based on Chrome, that supports the fusion of Node and Chrome and supports H5 direct access to node.js objects, with responsibility for data resource requests and layout, rendering, refreshing, and displaying pages.

Server 110 comprises a deployment module and/or an update request processing module. For example, as illustrated in FIG. 1, server 110 comprises deployment module 112 and update request processing module 114.

The deployment module of the server can be configured to communicate data resources with the terminal. As an example, the deployment module provides the terminal with data resources via one or more networks. In some embodiments, the deployment module of the server pushes data resources to the terminal. The deployment module can push the data resources to the terminal in connection with enabling the terminal to update a page displayed by the browser of the terminal based on updated data resources. For example, the terminal updates the page displayed by a browser of the terminal in response to a determination that a data resource is updated (e.g., in response to an updated data resource being detected).

The update request processing module is configured to obtain (e.g., receive) a data resource update request. For example, the update request processing module can receive a data resource update request sent by the terminal. The update request processing module can provide the terminal with an update successful response or a restore command comprising a data resource. The restore command can comprise one or more of a data resource, an identifier corresponding to a data resource, a location at which a data resource can be obtained, a version number of a data resource, etc. The update successful response or the restore command can be based at least in part on the data resource update request. In some embodiments, the update successful response is used in connection with indicating that the server has successfully updated the version number of the data resource based on the data resource update request. In some embodiments, the data resource in the restore command is obtained by the server in response to the data resource update request being denied. The restore command is sent by the server to the terminal. For example, in response to the data resource update request being denied, the server generates the restore command (e.g., which can include obtaining the corresponding data resource to include in the restore command).

In some embodiments, system 100 comprises a data resource library 160. The data resource library can be a database, etc. The data resource library can be communicated with one or more of the server 110 and/or at least one of the one or more terminals 120-140. In some embodiments, the data resource library stores data resources backed up by the server 110. The server can obtain the data resource from the data resource library, and the server can provide the obtained data resource to the terminal.

The system architecture described above can be realized based on Node.js as well as MongoDB and Web Socket technology. Other technologies can be implemented.

Figure 2:
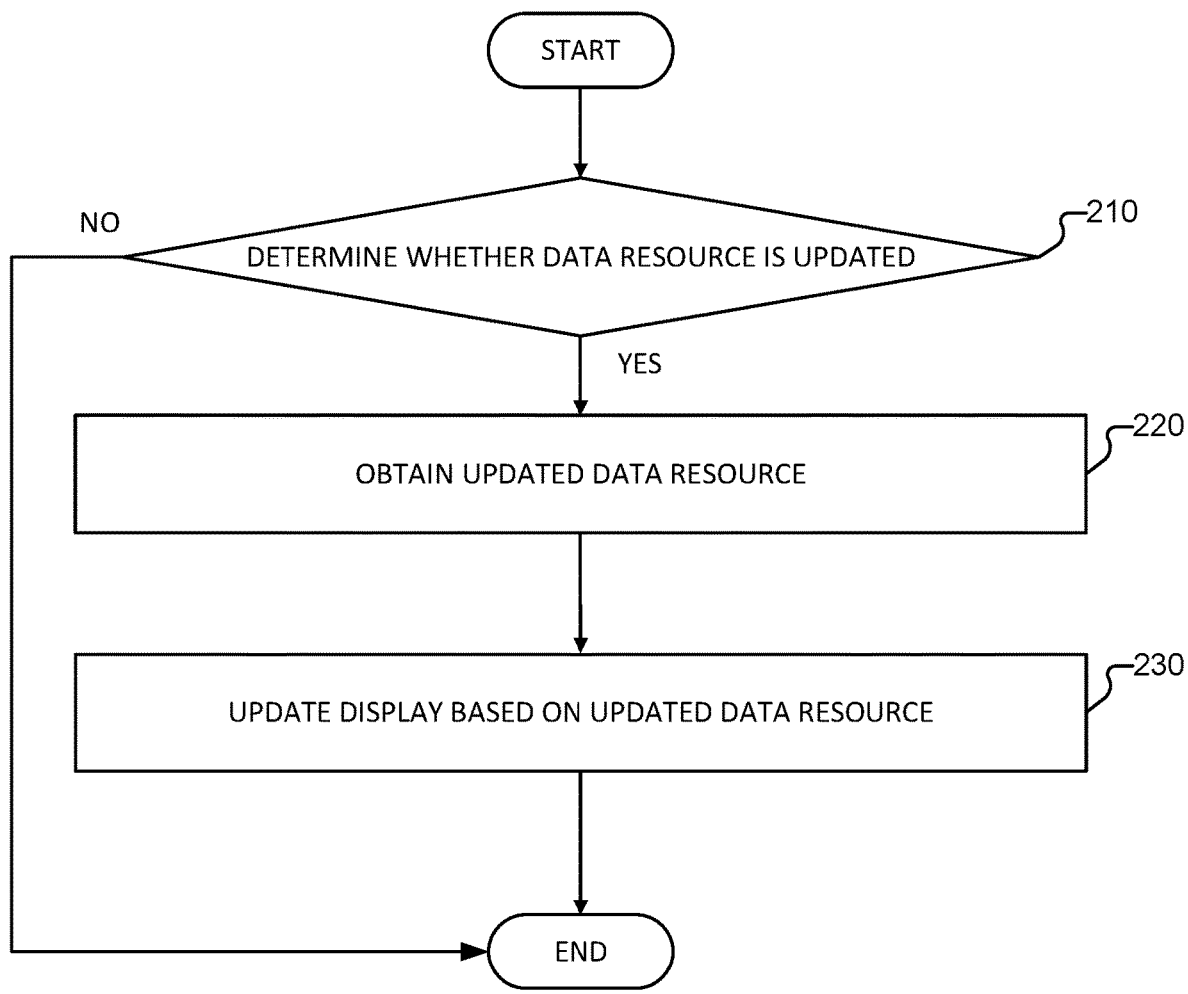
FIG. 2 is a flowchart of a method for an application hot deployment according to various embodiments of the present application.

FIG. 2 is a flowchart of a method for an application hot deployment according to various embodiments of the present application.

Referring to FIG. 2, process 200 for hot deployment (e.g., of an application) is provided. Hot deployment can also be referred to herein as hot application deployment. Process 200 can be implemented by system 100 of FIG. 1. Process 200 can be implemented in connection with process 300 of FIG. 3, process 400 of FIG. 4, and/or process 500 of FIG. 5. Process 200 can be implemented at least in part by terminal 600 of FIG. 6 and/or computer system 700 of FIG. 7.

According to various embodiments, process 200 is performed by a terminal. For example, process 200 can be performed by a terminal that is in connection with a server. The terminal can have one or more applications installed thereon. In some embodiments, process 200 is performed at least in part while an application is running on the terminal.

At 210, a determination is made as to whether a data resource is updated. In some embodiments, the terminal determines whether a data resource is updated. The terminal can determine that a data resource is updated based on information comprised in the resource, information associated with the data resource (e.g., metadata), etc. For example, the terminal can determine that a data resource is updated based on a version number or date stamp associated with a data resource. As another example, the terminal can determine a data resource (e.g., a new data resource or an obtained data resource) to an existing or a previous data resource. Based at least on whether the data resource is different from the existing or previous data resource, the terminal can determine that the data resource is updated. In some embodiments, the terminal determines that the data resource is updated based at least in part on one or more of a version associated with the data resource, a date modified that is associated with the data resource (e.g., and that indicates a date on which the corresponding data resource was last modified), information comprised in the data resource, a size of the data resource, etc. In some embodiments, the terminal determines that the data resource is updated based on the terminal obtaining an indication that the data resource is updated. For example, the terminal can receive the indication that the data resource is updated from a server to which the terminal is connected. As another example, the terminal can receive the indication that the data resource is updated from an application running on the terminal.

According to various embodiments, the terminal determines whether a data resource is updated in connection with a push/pull mechanism. For example, the push/pull mechanism communicates whether updated data resources are available or whether the data resources are updated. The push/pull mechanism can be implemented by a process running on the operating system (OS) level or the application level.

According to various embodiments, the terminal determines that a data resource is updated based at least in part on the terminal obtaining data resources that are pushed from the server. The terminal can determine that a data resource is updated based at least in part on the data resource or information associated therewith that the terminal receives from the server.

According to various embodiments, the terminal determines that a data resource is updated based at least in part on the terminal determining that data resources are updated by local Internet applications. A local Internet application can correspond to an Internet application running on the terminal. As an example, a process running on the terminal (e.g., on the operating system) receives an indication from an Internet application running on the terminal that the Internet application updates (e.g., changes, modifies, creates, etc.) a data resource. The indication can be communicated as a system event, an inter-process communication (IPC), etc.

In response to determining that a data resource is not updated, process 200 can end. In some embodiments, in response to determining that a data resource is not updated at 210, process 200 can return to 210 and after some time repeat the determination of whether a data resource is updated (e.g., until a data resource is determined to be updated). The terminal can determine whether the data resource is updated based at least in part on a pulling (e.g., according to predefined threshold time intervals, or according to one or more conditions or contexts). For example, the terminal can pull one or more processes running on an operating system, one or more applications running on the terminal, and/or one or more inputs to a module on the terminal.

If it is determined that the data resource is updated, at 220, an updated data resource is obtained. In some embodiments, the updated resource is obtained in response to determining that the data resource (e.g., the corresponding data resource) is updated. The updated data resource can be obtained from information communicated by a server, by an application running on the terminal, etc. For example, the server can communicate the updated data resource via an http or ftp channel. The terminal can store the updated data resource. The terminal can store the updated data resource over a corresponding existing data resource. For example, the terminal can replace the existing data resource with an updated data resource. As an example, the updated data resource is pushed to the terminal from the server. As another example, the terminal receives (e.g., from a server) a location from which the updated resource can be obtained (e.g., retrieved). The location from which the updated resource can be obtained can correspond to a network address, etc.

In some embodiments, 210 and 220 are performed as a single step.

At 230, a display is updated based on the updated data resource. The terminal can update the display based on the updated data resource. For example, the terminal updates the page displayed by the browser based on the updated data resource. As an example, the updated data resource can correspond to a new check box on a webpage, and upon the terminal updating the updated data resource, the terminal displays the new check box on the browser. In some embodiments, the updated data resource is script code. Accordingly, the updating of the updated data resource can be implemented while the corresponding application is running.

Various embodiments implement Internet application hot deployment via data resources pushed by the server. Various embodiments implement Internet application hot deployment via local updating of data resources by the terminal.

Figure 4:
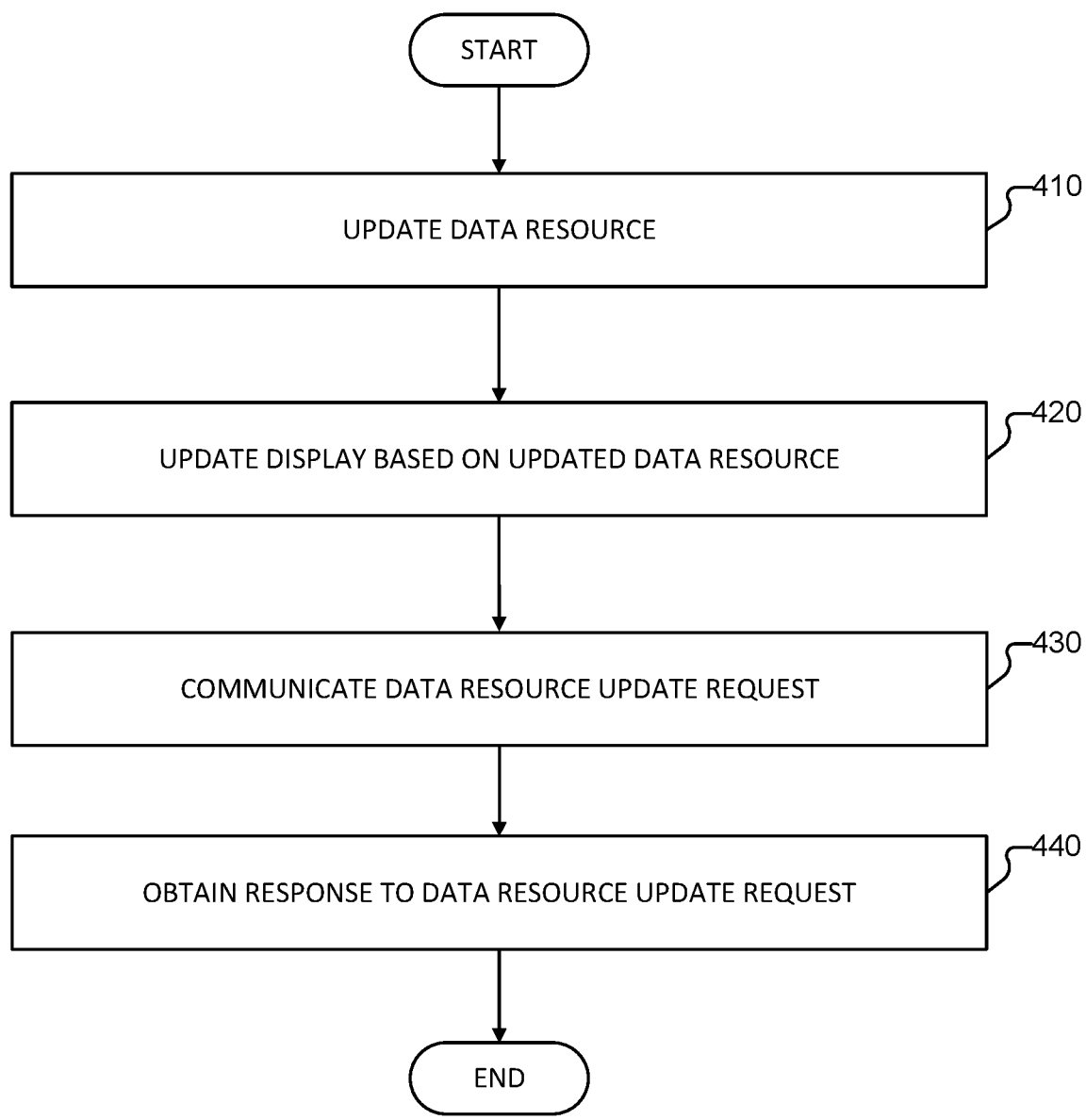
FIG. 4 is a flowchart of a method for an application hot deployment according to various embodiments of the present application.
Figure 5:
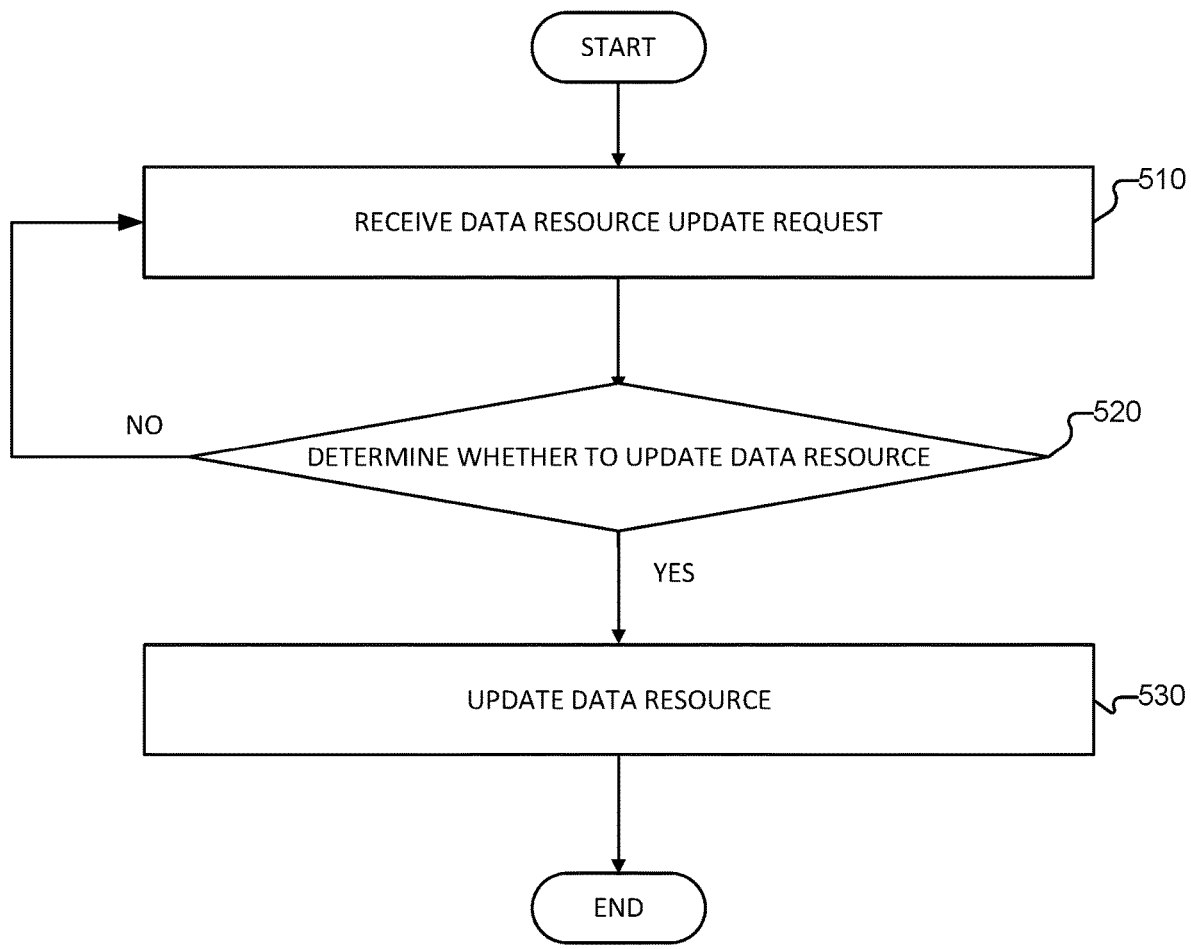
FIG. 5 is a flowchart of a method for an application hot deployment according to various embodiments of the present application.

In order to describe the embodiments of the present application clearly, the application hot deployment solution realized by server pushing is described in light of FIG. 4, and the application hot deployment solution realized by updating local data resources on the client device is described in light of FIG. 5.

Figure 3:
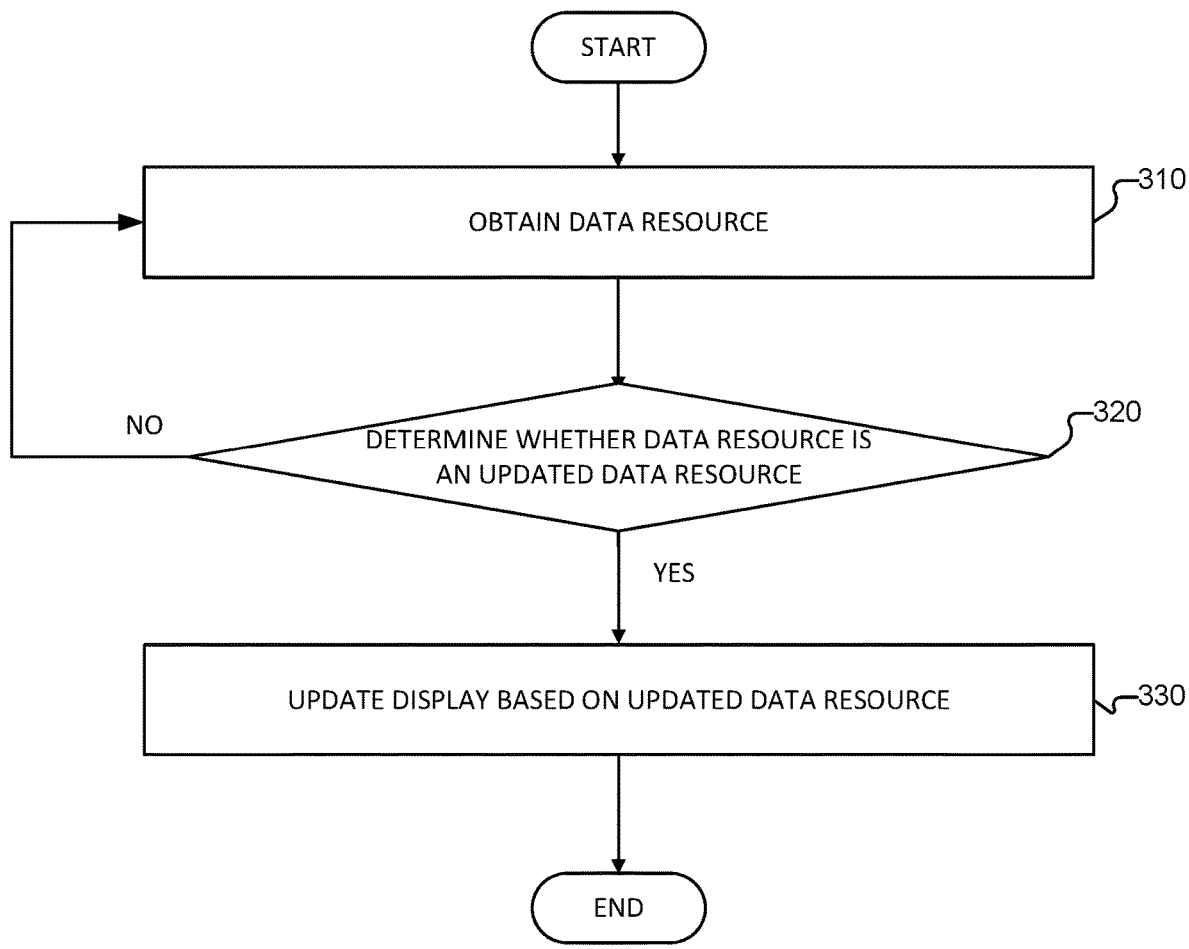
FIG. 3 is a flowchart of a method for an application hot deployment according to various embodiments of the present application.

FIG. 3 is a flowchart of a method for an application hot deployment according to various embodiments of the present application.

Referring to FIG. 3, process 300 for hot deployment (e.g., of an application) is provided. Hot deployment can also be referred to herein as hot application deployment. Process 300 can be implemented by system 100 of FIG. 1. Process 300 can be implemented in connection with process 200 of FIG. 2, process 400 of FIG. 4, and/or process 500 of FIG. 5. Process 200 can be implemented at least in part by terminal 600 of FIG. 6 and/or computer system 700 of FIG. 7.

According to various embodiments, process 300 can be implemented in connection with a server pushing updated data resources to the terminal. The terminal can implement process 300. For example, a process running on the operating system of the terminal can implement process 300.

At 310, a data resource is obtained. The terminal can obtain the data resource. For example, the terminal can obtain the data resource via a communication channel (e.g., an http channel) over one or more networks. In some embodiments, the server pushes the data resource to the terminal, and the terminal obtains the data resource that is pushed by the server. In some embodiments, the terminal obtains the data resource based at least in part on a processing of the data resource by one or more applications running on the terminal. The server can determine which terminal to push the data resource based on a version or update history of the terminals. For example, the server can store a mapping of versions or update history to terminals, and the server can query the mapping to determine the terminals to which the data resource is to be pushed. For example, the one or more applications can update, modify, create, etc. the data resource and the terminal can obtain the data resource based on such updating, modifying, creating, etc. of the data resource.

Before the server communicates the data resource (e.g., the updated data resource) to the terminal, the server can store the data resource (e.g., in the data resource library). For example, before the server pushes the updated data resource to the terminal, the server copies the data resource (e.g., the updated data resource) and saves the copy in a data resource library. In the event that a page update operation performed by the terminal fails, the data resource backed up before the update can be sent to the terminal to restore the page. As an example, the terminal provides an indication to the server indicating a successful update of the corresponding data resource. As another example, the terminal provides an indication to the server indicating a failure to update the corresponding data resource.

According to various embodiments, application hot deployment is offered as a subscription service. For example, one or more servers provide updating of an application using an application hot deployment model for a subscription fee. In some embodiments, the terminal registers with one or more servers for an application hot deployment service. As an example, one or more applications installed on the terminal can be registered with one or more servers for an application hot deployment.

The server can access a mapping which the server can use to determine one or more terminals to send the updated data resource. The mapping can be stored locally at the server or at a remote storage (e.g., a network storage such as a data library). The mapping can correspond to a mapping of identifiers associated with one or more terminals to identifiers associated with one or more data resources. The identifiers associated with the one or more terminals can comprise one or more of a terminal identifier (e.g., an Internet protocol (IP) address, a Media Access Control (MAC) address), a unique device identifier ((UDID), etc.), a user identifier (e.g., a user name, an identifier of an account, an identifier of a user associated with a terminal, etc.), etc. The identifiers associated with one or more data resources can comprise one or more of a uniform resource locator (URL), a uniform resource identifier (URI), a type of data resource, an identifier of an application to which the one or more data resources correspond, a name of a resource, a service with which the data resource is associated or used, etc.

In some embodiments, the terminal (e.g., an application running on the terminal) initiates an application hot deployment service subscription request. The application hot deployment service subscription request can correspond to a request for the terminal to subscribe to the application hot deployment service. The terminal can communicate the application hot deployment service subscription request before process 300 is invoked (or before 310 of process 300).

Referring back to 310 of process 300, in connection with changes to data resources at the server end (e.g., updates to the JavaScript code used on a page), an updated data resource is pushed to one or more terminals that have subscribed to the application hot deployment service.

According to various embodiments, information provided to the terminal by the server (e.g., pushed by the server) comprises data resources, and time information (e.g., time stamps) of the data resources, and/or version number information of the data resources.

The deployment module of the server can communicate the information (e.g., the data resources, etc.) to the terminal.

At 320, a determination of whether the data resource corresponds to an updated data resource is made. For example, a determination is made as to whether a particular data resource is updated. In some embodiments, the terminal determines whether the data resource corresponds to an updated data resource based at least in part on the obtained data resource. The terminal can determine whether the data resource (e.g., the obtained data resource) corresponds to an updated resource in response to the terminal obtaining the data resource (e.g., from the server).

According to various embodiments, the terminal determines whether the data resource corresponds to an updated data resource based at least in part on information associated with a version of the data resource (e.g., a version number, version identifiers, etc.). For example, the terminal determines that the data resource corresponds to an updated data resource if the version number of the obtained data resource (e.g., the data resource pushed by the server) is higher than the version number of a local data resource on the terminal (e.g., a data resource used by one or more applications installed on the terminal). If the version number of the obtained data resource (e.g., the data resource pushed by the server) is higher than the version number of a local data resource, the obtained data resource is deemed to be an updated data resource. If the version number of the obtained data resource (e.g., the data resource pushed by the server) is lower than (or the same as) the version number of a local data resource, the obtained data resource is deemed to not be an updated data resource.

According to various embodiments, the terminal determines whether the data resource corresponds to an updated data resource based at least in part on information associated with a date relating to the data resource (e.g., a date last modified, a date created, etc.). For example, the terminal determines that the data resource corresponds to an updated data resource if the date relating to the data resource (e.g., the data resource pushed by the server) is later (e.g., a more recent date) than a date of a local data resource on the terminal (e.g., a data resource used by one or more applications installed on the terminal). The push message can indicate that the data resource is an updated data resource and inform the terminal to update the corresponding data resource (with the updated data resource).

According to various embodiments, the terminal determines whether the data resource corresponds to an updated data resource based at least in part on information associated with an indicator that indicates whether a resource is an updated resource (e.g., a flag or other marking bit(s), etc.). For example, the terminal determines that the data resource corresponds to an updated data resource if the indicator associated with the data resource (e.g., the data resource pushed by the server) is set to a value or representation that the corresponding data resource is updated.

If the data resource is determined to not correspond to an updated data resource at 320, then process 300 can return to 310. For example, the terminal can wait for the data resource to be updated or for an updated data resource to be received from the server (e.g., pushed by the server). In some embodiments, in response to determining that the data resource does not correspond to an updated data resource at 320, process 300 ends.

According to various embodiments, a daemon can be set up in advance on the terminal. The daemon can monitor data resources pushed by the server or monitor for data resources (or other information) received by the terminal. As an example, the daemon is configured to constantly or continuously monitor data resources pushed by the server. As another example, the daemon is configured to monitor resources pushed by the server, wherein the daemon performs the monitoring according to one or more predefined threshold periods of time data, or in response to one or more predefined events. The one or more predefined threshold periods of time or the one or more predefined events can be configured by a user, an application, an administrator, a manufacturer, an application developer, etc. The one or more predefined threshold periods of time or the one or more predefined events can be set on an application-by-application basis, a type of application-by-type of application basis, etc. In response to a data resource pushed by the server being detected (e.g., in response to the daemon detecting a data resource pushed by the server or otherwise determining that the terminal receives the data resource communicated by the server), the terminal obtains information pertaining to the data resources. For example, the terminal obtains time information associated with the data resource (e.g., a time stamp) and/or version information (e.g., version number information) of the data resource. The terminal determines that the obtained data resource corresponds to an updated data resource based at least in part on the time information of the obtained data resource and/or version number information of the obtained data resource. As an example, the daemon determines whether the obtained data resource corresponds to an updated data resource. As another example, an application and/or a process running on the terminal determines whether the obtained data resource corresponds to an updated data resource.

In some embodiments, the detection module of the terminal performs 320 of process 300 of FIG. 3.

If the data resource is determined to correspond to an updated data resource at 320, then process 300 proceeds to 330.

At 330, a display is updated based on the updated data resource. In some embodiments, the terminal updates a display based at least in part on the updated data resource. For example, in response to determining that the obtained data resource corresponds to an updated data resource, the terminal updates the display based on the updated data resource. Updating the display based on the updated data resource can comprise updating information being displayed by the terminal, etc. The terminal can update the page displayed by the browser based on the updated data resource (e.g., the data resource pushed by the server).

As an example, a deployment module of the terminal and/or the browser module of the terminal performs 330 of process 300 of FIG. 3. Specifically, the deployment module can instruct the browser module to update the page displayed based on the updated data resource.

In some embodiments, updating the display based at least in part on the updated data resource comprises invoking a cache reload method. The cache reload method can be invoked to update the display. For example, the cache reload method can be invoked to update the page layout and to perform a page rendering (e.g., based on the updated page layout and/or based on the updated data resource). The cache reload method can be a predefined function or process that is called by the terminal. For example, the cache reload method can be called by a process running on the operating system of the terminal, an application running on the terminal, etc. As an example, the deployment module of the terminal invokes a cache reload method (e.g., the CacheReload method in YunOS) in the browser module to update the page layout and perform page rendering. The cache reload method can correspond to a process for refreshing cache memory.

Various embodiments implement updating of an entire page (e.g., in connection with obtaining an updated data resource). Some embodiments implement a local update of a page (e.g., in connection with obtaining an updated data resource). For example, a part of a page can be updated in connection with the terminal obtaining an updated data resource. Local update events can be registered (or otherwise defined) in advance. In response to the terminal receiving an event (or an indication of an event) sent by the server, the terminal can update local content of the page based on the updated data resource. The local update of the page (e.g., a page local refresh solution) can be applied to nodejs, js, or http page development. An update of local content on the page can comprise refreshing specified content comprised in the page. In some embodiments, a single local update event can occur or a plurality of local update events can occur. For example, a number of the local update events can be one or a plurality. In some embodiments, each local update event has one or more corresponding updates (e.g., that are performed in response to invocation of the corresponding local update event). In some embodiments, one local update event is used to instruct a refresh of specified local content contained in the page. For example, local update event 1 is used to instruct the update of the navigation bar, and local update event 2 is used to instruct the update of the CSS codes used by the page.

As an example, if local update events are registered or otherwise defined (in the terminal), then, in response to the terminal determining (e.g., detecting) that the terminal obtained a local update event pushed by the server, the terminal sends a local update message to the local application on the terminal. The local update message can be sent to the local application on the terminal while the local application is running (e.g., being executed) on the terminal. For example, the deployment module on the terminal can send the local update message to the local application on the terminal. In some embodiments, a JS operation of the DOM Document Object Model (DOM) interface is used in connection with the application invoking the updating based on the updated resource. For example, the JS operation of the DOM interface can invoke a process or module on the terminal (e.g., the browser module) to use the updated data resource to perform partial layout and rendering of the page. A partial update comprises updating a subset of the page (e.g., to update a part of the page that corresponds to an update). As an example, a partial update updates less than the whole page. The corresponding data resource, partial layout, or page subject to rendering can be identified in (or by) the local update event. The page can be updated (e.g., refreshed) based at least in part on the performing of the local layout and rendering of the page instructed in the local update event. The user can use the local application on the terminal to develop Internet application pages. For example, a developer can code the page using a local development tool on the terminal. Generally, a developer can code and test a webpage in the local environment of the developer.

According to various embodiments, DOM is the standard programming interface recommended by W3C for the processing of Extensible Markup Language, and is a document model described in an object-oriented manner. DOM defines the objects used in connection with (e.g., required to) indicating and revising a document, the conduct and attributes of these objects, and the relationships between such objects. DOM can be considered to be a tree representation of the data and structure on a page. DOM is able to access and revise the content and structure of a document in a manner that is independent of the platform and language. As an example, the use of DOM to access and/or revise the content and structure of a document is a method of indicating and processing an HTML or XML document. DOM technology enables dynamic changes to user pages. For example, an element can be dynamically displayed or hidden. As another example, attributes of an element can be dynamically changed. As another example, an element can be dynamically added. Other dynamic functions are possible based on use of DOM technology. According to various embodiments, an HTML file can be rebuilt or updated in connection with JavaScript's invocation of the DOM interface. For example, through JavaScript's invocation of the DOM interface, an entire HTML file can be rebuilt. According to various embodiments, items on the page can be added, removed, changed, or rearranged. Examples of such items include a check box, a button, a text box, etc.

In some embodiments, the terminal provides to the server an indication of a status of an update (e.g., an update based on the updated data resource). For example, the terminal can feed a response back to an application server based on the status of the page update operation. For example, if the page update is successful, then the terminal can feed back page update successful information to the server. As another example, if the page update fails, then the terminal can feed back page update failure information to the server. The page update failure information can comprise information related to the data resource. For example, the page update failure information can comprise the identifier of the page element, the filename of the code segment, or content of the data resource. In response to the server receiving the page update failure information, the server can provide a data resource stored at the server (or at a data storage associated with the server) and provide the data resource to the terminal. For example, in response to the server receiving the page update failure information, the server obtains (e.g., retrieves) the data resource that was stored at, or accessible to, the server before the update, and the server sends the data resource to the terminal. The server can obtain (e.g., retrieves) the data resource that was backed up based on the page update failure information. In response to the terminal receiving the data resource returned by the server (e.g., the backed up data resource that is returned in response to page update failure information), the terminal updates the page displayed by the browser based on the data resource returned by the server.

FIG. 4 is a flowchart of a method for an application hot deployment according to various embodiments of the present application.

Referring to FIG. 4, process 400 for hot deployment (e.g., of an application) is provided. Hot deployment can also be referred to herein as hot application deployment. Process 400 can be implemented by system 100 of FIG. 1. Process 400 can be implemented in connection with process 200 of FIG. 2, process 300 of FIG. 3, and/or process 500 of FIG. 5. Process 400 can be implemented at least in part by terminal 600 of FIG. 6 and/or computer system 700 of FIG. 7.

According to various embodiments, process 400 is implemented by a terminal. The terminal can be in connection with one or more servers via one or more networks. The one or more servers can correspond to an application server. The one or more servers can provide the terminal with a subscription service.

At 410, a data resource is updated. In some embodiments, the data resource is updated locally at a terminal. For example, a local application on the terminal updates the data resource. The local application on the terminal can correspond to an application running on the terminal. As an example, the local application is an Internet application.

In some embodiments, the local application on the terminal corresponds to an Internet application development program. An Internet application development program can comprise a local development tool used by a developer to code and test a webpage. The local application (e.g., an Internet application development program) can be used in connection with updating the data resources of an Internet application. For example, a user can use the local application to update the JavaScript program code used by an Internet application page, or to update the layout of an Internet application page.

At 420, a display is updated based on the updated data resource. In some embodiments, the terminal updates the display based at least in part on the updated data resource. The terminal updates the display in response to the data resource being updated (e.g., in response to the terminal determining that the data resource is updated). The display can correspond to a page displayed by the terminal. For example, the display can be a page currently being displayed by an application running on the terminal. The terminal can update the page displayed by the browser based on the data resource updated by the local application (e.g., the updated data resource).

For example, if the local application on the terminal updates the JavaScript program code used by a page or the page layout, then at 420, the terminal (e.g., the deployment module of the terminal) can invoke a page reload. The terminal (e.g., the deployment module) can invoke a browser on the terminal (e.g., a browser module) to perform a page reload. As an example, the terminal (e.g., the deployment module) invokes a process for a page reload (e.g., by the browser module) to initiate a resource request. The terminal can load, lay out, and render the page. For example, the terminal can load, lay out, and render the page based at least in part on the updated data resource.

In some embodiments, process 400 ends after 420 (e.g., upon an update of the display based on the updated data resource). In some embodiments, the process comprises at least one or more of 430 and/or 440.

At 430 a data resource update request is communicated. In some embodiments, the terminal communicates the data resource update request to the server. For example, the terminal communicates the data resource update request to a server associated with the data resource (e.g., a server associated with an application installed on the terminal for which the data resource is updated, etc.). In some embodiments, the data resource update request comprises the updated data resource (e.g., a data resource updated by a local application on the terminal). In some embodiments, the data resource update request comprises one or more of an identifier associated with the data resource update request, a location at which the data resource is stored or located or from which the data resource can be obtained (e.g., a URL), a version number associated with the data resource, time information corresponding to the data resource (e.g., a time associated with a modification, a creation date, etc.), etc. In some embodiments, the data resource update request can be used in connection with the server updating the version number of the data resource. The server can update a version number of the data resource based on the data resource or other information associated with the data resource comprised in the request. In some embodiments, the data resource update requests the server to update the version number of the data resource.

At 440, a response to a data resource update request is obtained. In some embodiments, the terminal obtains from the server a data resource update request. The response to the data resource update request can comprise or otherwise indicate a processing result of the corresponding data resource update request. The response to the data resource update request can include an indication that the server performed or is to perform the relevant processing corresponding to the data resource update request.

In some embodiments, if the terminal receives a response to the data resource update request that comprises an indication that an update to the data resource is successful (e.g., from the server), then the terminal maintains the page displayed in the browser. In some embodiments if the terminal receives a restore command returned by the server (e.g., in response to the terminal receiving a response to the data resource update request that comprises a restore command or an indication for the terminal to perform a restore command), then the terminal updates the page being displayed (e.g., by the browser based on the data resource contained in the restore command). The page (e.g., being displayed) is restored to the page before the update in connection with the terminal updating the page being displayed in response to a restore command from the server.

A lag between the communication of the data resource update request and the obtaining of a response to the data resource update request can exist. Some embodiments include a compensation for such lag. For example, lag compensation can be achieved based at least in part on an updating of the page without waiting for a response from the server. For example, in connection with the client device performing an operation, the page can be updated directly and the terminal does not need to await a response from the server. Updating the page directly can correspond to not requiring a response from the server in connection with an update. In response to a determination (e.g., by the terminal) that the response to the data resource update request and to the action performed being by the terminal (e.g., updating the data resource), the page can be refreshed based on the data resource returned by the server, which compensates for the previous page refresh operations performed by the terminal.

FIG. 5 is a flowchart of a method for an application hot deployment according to various embodiments of the present application.

Referring to FIG. 5, process 500 for hot deployment (e.g., of an application) is provided. Hot deployment can also be referred to herein as hot application deployment. Process 500 can be implemented by system 100 of FIG. 1. Process 500 can be implemented in connection with process 200 of FIG. 2, process 300 of FIG. 3, and/or process 400 of FIG. 4. Process 500 can be implemented at least in part by terminal 600 of FIG. 6 and/or computer system 700 of FIG. 7.

According to various embodiments, process 500 is implemented by one or more servers. The one or more servers can correspond to an application server. The one or more servers can provide a subscription service. For example, one or more servers provide updating of an application using an application hot deployment model (e.g., for a subscription fee). In some embodiments, a terminal registers with one or more servers for an application hot deployment service. As an example, one or more applications installed on the terminal can be registered with one or more servers for an application hot deployment.

According to various embodiments, process 500 is implemented by a server. The server can be in connection with one or more terminals via one or more networks. The server can correspond to an application server. The server can provide the terminal with a subscription service.

At 510, a data resource update request is obtained. In some embodiments, the server obtains the data resource update request. The server can obtain the data resource request from a terminal.

In some embodiments, the terminal communicates the data resource update request to a server associated with the data resource (e.g., a server associated with an application installed on the terminal for which the data resource is updated, etc.). In some embodiments, the data resource update request comprises the updated data resource (e.g., a data resource updated by a local application on the terminal). In some embodiments, the data resource update request comprises one or more of an identifier associated with the data resource update request, a location at which the data resource is stored or located (e.g., a URL) or from which the data resource can be obtained, a version number associated with the data resource, time information corresponding to the data resource (e.g., a time associated with a modification, a creation date, etc.), etc. In some embodiments, the data resource update request can be used in connection with the server updating the version number of the data resource. The server can update a version number of the data resource based on the data resource or other information associated with the data resource comprised in the request. In some embodiments, the data resource update requests the server to update the version number of the data resource.

At 520, a determination is made as to whether to update the data resource. In some embodiments, the determination of whether to update the data resource is based at least in part on the data resource update request. The server can determine whether to update the resource. For example, in response to obtaining the data resource update request, the server determines whether to update the data resource based on the data resource update request. The data resource corresponding to the determination of whether to update the resource comprises a data resource stored at the server or that is accessible to the server (e.g., via a network storage, a data library, etc.). For example, the server can determine whether to update a server-side version of the data resource based at least in part on the data resource update request.

The server can determine to update the data resource if the data resource corresponding to the data resource update request corresponds to an updated data resource. As an example, the server can determine to update the data resource based on a version number associated with the data resource and a version number associated with an updated data resource. For example, if time information associated with the data resource corresponding to the data resource update request corresponds to (or indicates that) the data resource has been created, modified, etc. more recently than the data resource stored on the server side (e.g., based at least on time information associated with the data resource stored on the server side), then the server can deem the data resource corresponding to the data resource update request to correspond to an updated data resource, or the server can determine to update the data resource. As another example, if version information associated with the data resource corresponding to the data resource update request corresponds to (or indicates that the data resource is) a version that is newer than a version of the data resource stored on the server side, then the server can deem the data resource corresponding to the data resource update request to correspond to an updated data resource, or the server can determine to update the data resource. Other implementations for determining whether to update the data resource are possible. For example, if a box exists (or is created after an update), a rollback operation can be executed. The rollback operation can be implemented by enforcing all the terminals and/or servers to update the data to the previous old version.

If the server determines not to update the data resource at 520, then process 500 returns to 510. For example, the server can poll for other data resource update requests, etc. As another example, if the server determines not to update the data resource at 520, the process ends.

If the server determines to update the data resource at 520, then the server proceeds to 530.

At 530, the data resource is updated. In some embodiments, the server updates the data resource. For example, in response to determining to update the data resource based at least in part on the data resource update request, the server updates the data resource. The updating of the data resource can comprise storing the data resource. The server can associate a version number with the data resource. For example, the version number associated with the updated data resource can distinguish the corresponding data resource from another version of the data resource that is stored.

In some embodiments, the server can provide an indication to the terminal of a status of the updating of the data resource. For example, the server can communicate a response to a data resource update request to the terminal. The response to the data resource update request can comprise or otherwise indicate a processing result of the corresponding data resource update request. The response to the data resource update request can include an indication that the server performed or is to perform the relevant processing corresponding to the data resource update request.

In some embodiments, the server provides to the terminal a response to the data resource update request that comprises an indication that an update to the data resource is successful. In response to the server providing an indication that the update to the data resource is successful, the terminal can maintain the page displayed in the browser. In some embodiments, the server provides to the terminal a restore command. In response to the terminal receiving a response to the data resource update request that comprises a restore command or an indication for the terminal to perform a restore command, then the terminal updates the page being displayed (e.g., by the browser based on the data resource contained in the restore command). The page (e.g., being displayed) is restored to the page before the update in connection with the terminal updating the page being displayed in response to a restore command from the server.

If the server successfully updates the version number of the data resource based on the received data resource update request, then the server returns an update successful response to the client device. If the server denies the data resource update request, then the server retrieves the data resource before the update, and returns a restore command comprising this data resource to the terminal. If the server denies the data resource update request, the server can also return a restore command that does not need to comprise a data resource. The restore command can instruct the terminal to restore the page to the form before the update of the data resource (e.g., before the local application on the terminal updates a data resource, and the pre-updated data resource can be backed up locally on the terminal).

As an example, after the server (e.g., the deployment module in the server) receives a data resource update request sent by the terminal, based on one or more preset detection rules, the server determines whether the data resource is to be updated to the latest version. In response to the server determining that the data resource is to be updated to the latest version, the server returns an update successful response to the terminal. In some embodiments, "to update the data resource to the latest version" comprises: the update content of data resource update requests submitted by one or more terminals or submitted over the course of multiple requests by a terminal can be accepted or rejected based on preset detection rules, and, for acceptable updates, the latest version of the data resource can be generated. The preset detection rules can include comparing a priority associated with a request. For example, a request corresponding to a higher priority can be implemented (even if the other requests have more recent version information or time stamp information). Furthermore, the data resource for the latest version can be pushed to the terminal.

Various embodiments update an entire page (e.g., based at least in part on an updated data resource). In some embodiments, local updates of a page are implemented (e.g., based at least in part on an updated data resource). As an example, local update events can be registered in advance. In response to the terminal receiving an event sent by a local application and if the event is a pre-registered local update event (e.g., in response to a determination that the local event corresponds to a pre-registered local update event), the terminal can update local content of a page based on the updated data resource. As an example, a number of the local update events can be one or more, and one local update event is used to instruct a refresh of specified local content comprised in the page.

As an example, if local update events are registered in the terminal (e.g., the deployment module), then in response to the terminal (e.g., the detection module) detecting a local update event sent by a local application, the terminal instructs the local application to invoke a browser (e.g., the browser module). The terminal can invoke the browser by using a JS operation of the DOM interface. The terminal invokes the browser to use the updated data resource to perform the local layout and rendering with respect to the local content of the page instructed in the local update event. Accordingly, the terminal refreshes the page (e.g., based at least in part on the updated data resource).

According to various embodiments, in response to determining that the data resource is updated (e.g., in response to detecting an updated data resource), the page displayed by the browser is updated based on the updated data resource. Because the granularity of data resources is smaller than that of application modules or files, in comparison to the conventional art, various embodiments implement data resource synchronization (e.g., updating of data resources) with finer granularity, thereby enabling the resource synchronization (e.g., updating of data resources) delay to be reduced. According to various embodiments, in response to determining that the data resource is updated (e.g., in response to detecting an updated data resource), the page can be updated (e.g., immediately) based on the updated data resource, thus further reducing the resource synchronization delay, and improving the user experience.

Figure 6:
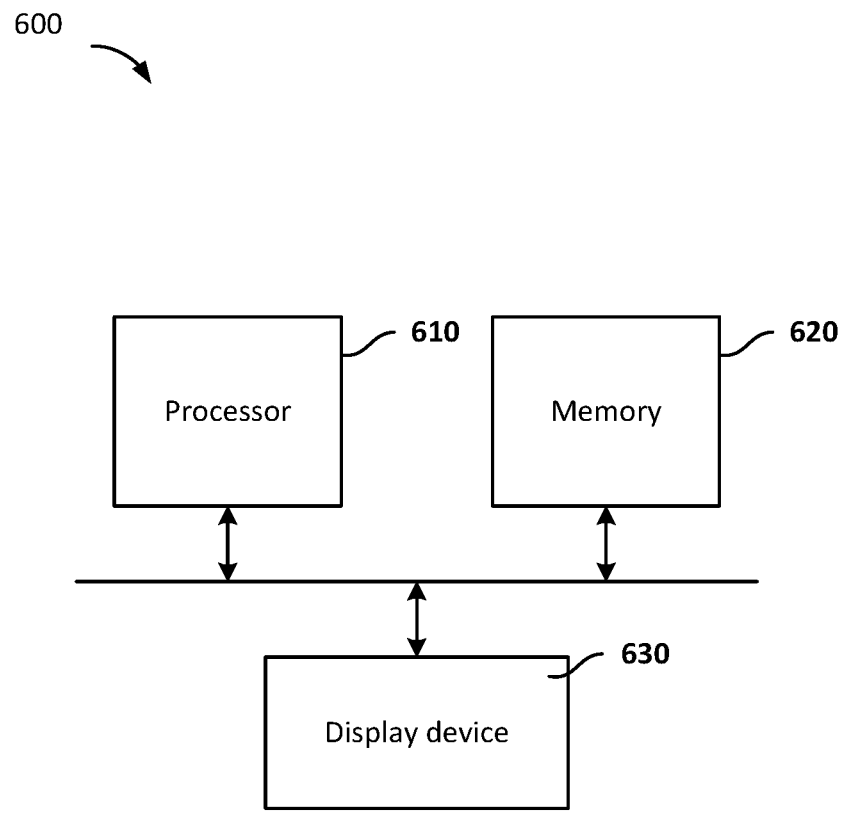
FIG. 6 is a diagram of a device for application hot deployment according to various embodiments of the present application.

FIG. 6 is a diagram of a device for application hot deployment according to various embodiments of the present application.

Referring to FIG. 6, device 600 for hot deployment (e.g., of an application) is provided. Hot deployment can also be referred to herein as hot application deployment. Device 600 can implement at least part of system 100 of FIG. 1. Device 600 can implement process 200 of FIG. 2, process 300 of FIG. 3, process 400 of FIG. 4, and/or process 500 of FIG. 5.

Device 600 can implement the terminal according to various embodiments.

As illustrated in FIG. 6, device 600 comprises: a processor 610, memory 620, and a display device 630.

Processor 610 can be a general purpose processor (such as a microprocessor or any conventional processor), a digital signal processor, an application-specific integrated circuit, a field programmable gate array or other programmable logic device, a discrete gate or transistor logic device, or discrete hardware components. Memory 620 can comprise internal memory and/or external memory, such as random access memory, flash memory, read-only memory, programmable read-only memory, or electrically erasable programmable memory, registers, or other mature storage media in this field. Display device 630 can comprise a touchscreen controller circuit.

Data communication connections exist between processor 610 and the other various modules, for example, data communication can be handled based on bus architecture. Bus architecture may comprise any number of interconnecting buses and bridges, specifically by linking together one or more processors represented by processor 610 and various memory circuits represented by memory 620. Bus architecture may further link various other types of circuits together, such as peripheral device, voltage stabilizer, and power management circuits, all of which are well known in the art, and will therefore not be further described in this document.

The bus interface provides an interface. Processor 610 is configured to manage the bus architecture and ordinary processing, and memory 620 can store data used by the processor 610 in connection with processor 610 executing operations.

Various embodiments of application hot deployment or data resource management processes can be applied in the processor 610, or can be realized by the processor 610. During the implementation process, the various steps of the image search process can be accomplished using integrated logic circuits of hardware in the processor 610, or in the form of software commands. The various methods, steps, and logic blocks disclosed in the embodiments of the present application can be realized or executed. The combination of steps in the method disclosed in the embodiments of the present application can be executed and accomplished directly by hardware in the form of a processor, or can be executed and accomplished using a combination of hardware and software modules in a processor. Software modules can be located in storage media that are mature in this field of technology, such as random access memory, flash memory, read-only memory, programmable read-only memory, or electrically erasable programmable memory or registers.

Processor 610, coupled with the memory 620, is used to read the computer program commands stored in the memory 620.

In some embodiments, processor 610 is configured to detect the presence of updated data resources. Processor 610 can determine whether a data resource is updated. The data resources can comprise page elements and/or code segments.

In some embodiments, processor 610 is configured to, if an updated data resource is detected, update the page displayed by the browser, the page being updated based on the updated data resource.

In some embodiments, processor 610 is configured to receive data resources pushed by the server. If the version number of a data resource pushed by the server is higher than the version number of the local data resource on the terminal, processor 610 determines that the data resource pushed by the server corresponds to an updated data resource.

In some embodiments, processor 610 is configured to, if the operation to update the page displayed by the browser based on the updated data resource fails, feed page update failure information back to the server; and, receive the data resource returned by the server. The data resource returned by the server is the data resource backed up by the server before the version number update, retrieved by the server based on the page update failure information. The processor can update the page displayed by the browser based on the data resource returned by the server.

In some embodiments, processor 610 is configured to, in response to detecting an updated data resource, receive a data resource updated by a local application, and determine the data resource updated by the local application to be an updated data resource.

In some embodiments, processor 610 is configured to send a data resource update request to the server. The data resource update request comprises the data resource updated by a local application, and the data resource update request is used to request the server to update the version number of the data resource based on the data resource contained in the request.

In some embodiments, processor 610 is configured to, after sending the data resource updated by the local application to the server, receive an update successful response returned by the server. The update successful response is used to indicate that the server has successfully updated the version number of the data resource based on the data resource update request. Processor 610 can receive a restore command returned by the server, and update the page displayed by the browser based on the data resource contained in the restore command. The data resource contained in the restore command is a data resource obtained by the server in response to the data resource update request being denied.

In connection with updating the page displayed by the browser based on the updated data resource, if processor 610 receives a local update event, processor 610 updates local content of the page displayed by the browser based on the received local update event and the updated data resource.

In connection with updating local content of the page displayed by the browser, based on the received local update event, through JavaScript operation of the DOM interface, processor 610 can use the updated data resource to perform a local refresh of the page with respect to the local content of the page instructed in the local update event.

The number of the local update events is one or more, and one local update event is used to instruct a refresh of specified local content comprised in the page.

In some embodiments, processor 610 can establish a connection with the server and maintain the validity of the connection. The connection is used to transmit the data resources exchanged with the server.

Various embodiments improve operating performance; particularly in situations in which there is no Internet connection, Internet applications can use cached data resources, avoiding the problem of the inability to use Internet applications in such situations. In addition, the embodiments of the present application support a variety of caching strategies (full caching, partial caching, etc.), and support dynamically adjusted caching based on network status, device memory/CPU status, etc. (for example, data resources with the cache released), thereby maximizing the balancing of performance and memory use.

Figure 7:
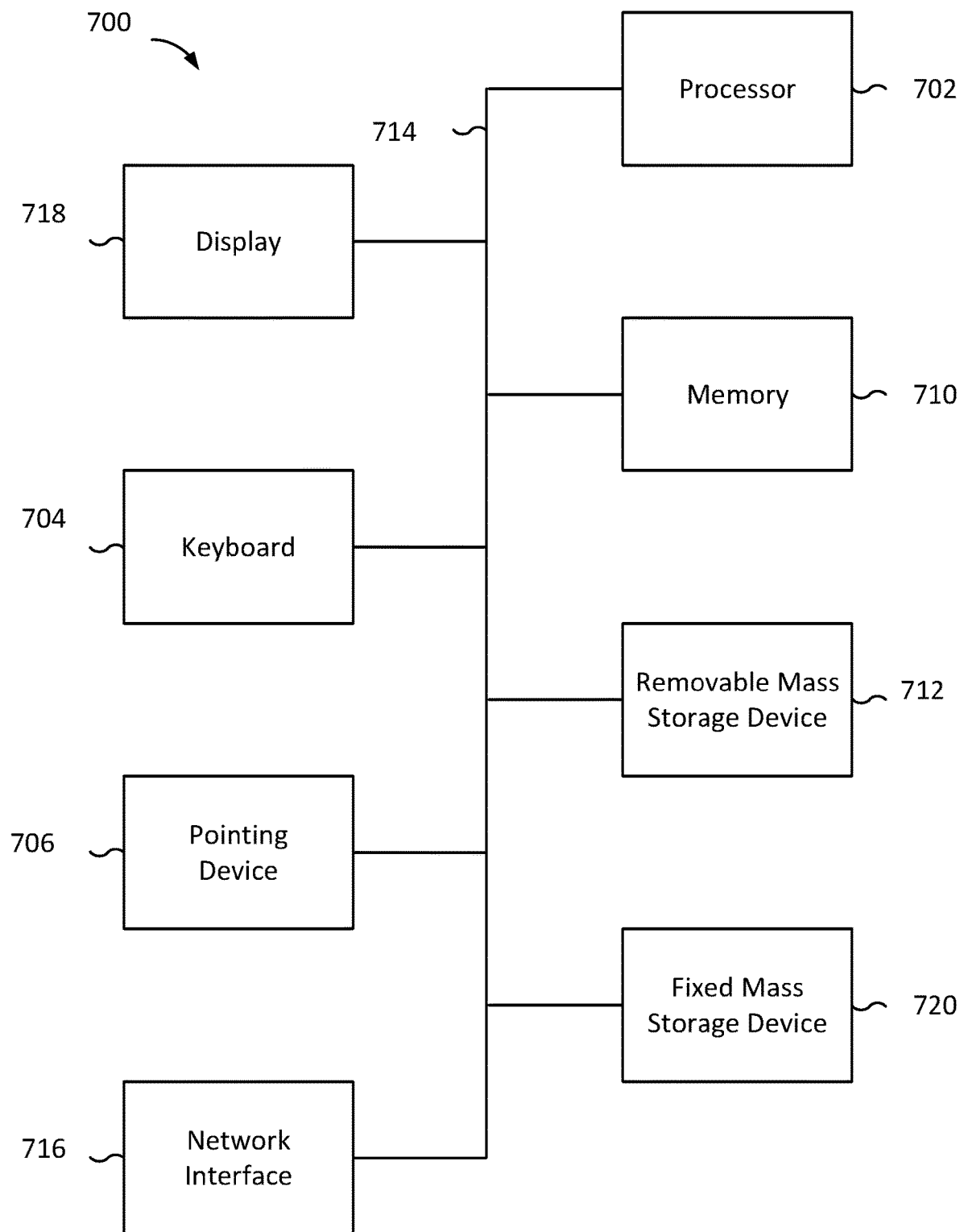
FIG. 7 is a functional diagram of a computer system for application hot deployment according to various embodiments of the present application.

FIG. 7 is a functional diagram of a computer system for application hot deployment according to various embodiments of the present application.

Referring to FIG. 7, computer system 700 is provided. Computer system 700 can implement at least part of system 100 of FIG. 1. Computer system 700 can implement process 200 of FIG. 2, process 300 of FIG. 3, process 400 of FIG. 4, and/or process 500 of FIG. 5.

Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718).

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown). The memory can be a non-transitory computer-readable storage medium.

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storage device 712 and fixed mass storage 720 generally store additional programming instructions, data, and the like that typically are not in active use by the processor 702. It will be appreciated that the information retained within mass storage device 712 and fixed mass storage 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

It should be understood that the devices and methods that are disclosed in the several embodiments provided above can be realized in other ways. For example, the device embodiment described above is merely illustrative. For example, the delineation of units is merely a delineation according to local function. The delineation can take a different form during actual implementation.

The present application is described based on the flowcharts and/or block diagrams of the method, devices (system), and computer program products of the embodiments of the present application. It should be understood that each flowchart and/or block diagram within the flowcharts and/or block diagrams and combinations of flowcharts and/or block diagrams within the flowcharts and/or block diagrams can be realized by computer program commands. These computer program commands can be provided to general-purpose computers, special-purpose computers, embedded processors, or the processors of other programmable data processing devices, to give rise to a machine which, through commands executed by the processor of a computer or other programmable data processing equipment, gives rise to a device used to realize the functions designated in one or more processes in a flowchart and/or one or more blocks in a block diagram.

These computer program commands can also be stored in computer-readable memory capable of guiding a computer or other programmable data processing device to operate in a specified manner, so that the commands stored in such computer-readable memory give rise to a manufactured product that includes the commanded devices, and the commanded devices realize the functions designated in one or more processes and/or one or more blocks in a flowchart.

These computer program commands can also be loaded on a computer or other programmable processing device, causing a series of operational steps to be executed on the computer or other programmable device to give rise to computer-realized processing, so that the commands executed on the computer or other programmable device provide the steps to realize the functions designated in one or more processes and/or one or more blocks in a flowchart.

Although preferred embodiments of the present application have been described, once persons skilled in the art grasp the basic creative concept, they can make additional modifications and revisions to these embodiments. Therefore, the attached claims are intended to be interpreted as including the preferred embodiments as well as all modifications and revisions that fall under the scope of the present application.

Clearly, persons skilled in the art can make various modifications and variations to the present application without departing from the spirit and scope of the present application. Thus, if such revisions and variations of the present application belong within the scope of the claims of the present application and equivalent technologies, then the present application also intends to cover such modifications and variations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   for individual data resources in a plurality of data resources included in an application (app), determining, by one or more processors associated with a terminal, that a data resource of the plurality of data resources is updated, wherein the data resource is a subcomponent of a webpage;
   in response to determining that the data resource is updated:
      obtaining, by the one or more processors, an updated data resource; and
      applying, based at least in part on the updated data resource, an update to a page displayed by a browser on the terminal, wherein:
         the applying the update to the page displayed by the browser comprises invoking an update to a layout for a first part of the page, and performing a page rendering of the first part of page;
         the update to the page is invoked without correspondingly updating a layout of a second part of the page or without correspondingly rendering of the second part of the page;
         the first part of the page corresponds to the updated data resource, and the second part of the page does not correspond to the updated data resource;
         the updated data resource is used in connection with the page being rendered; and
         the updated data resource includes a line number or offset indicating a location of the data resource to be updated; and
   in response to applying the update to the page, communicating, by the one or more processors, an indication of whether the update to the page is successful, the indication being communicated to a server from which the terminal obtained the updated data resource.

2. The method of claim 1, wherein the page is updated concurrently with an application running on the terminal, and the application is processing or displaying the page.

3. The method of claim 1, wherein the determining that the data resource is updated comprises:
   obtaining a data resource, the data resource being communicated to the terminal by a server;
   comparing a version identifier of the data resource communicated by the server with a version identifier of a local data resource that corresponds to the data resource communicated by the server; and
   determining that the data resource is updated based at least in part on the comparison of the version identifier of the data resource communicated by the server with the version identifier of the local data resource.

4. The method of claim 3, further comprising:
   in response to a determination that the version identifier of the data resource communicated by the server corresponds to a newer version than the version identifier of the local data resource, determining that the data resource is the updated data resource.

5. The method of claim 3, further comprising:
   in response to a determination that the updating of the page displayed by the browser fails:
      communicating update failure information to the server;
      obtaining a data resource communicated by the server, wherein, the data resource communicated by the server corresponds to a backed up version of the data resource that was backed up by the server before an updating of the data resource, and the data resource is obtained by the server based at least in part on the update failure information; and
      updating the page displayed by the browser based at least in part on the data resource communicated by the server.

6. The method of claim 1, wherein the determining that the data resource is updated comprises:
   obtaining the data resource, the data resource corresponding to a resource that is updated by a local application; and
   determining the resource updated by the local application to be an updated data resource.

7. The method of claim 6, further comprising:
   sending a data resource update request to a server, the data resource update request comprising information corresponding to the updated data resource, and the data resource update request corresponding to a request for the server to update a version identifier of the updated data resource based at least in part on the updated data resource included in the data resource update request.

8. The method of claim 7, further comprising:
   obtaining an update successful response communicated by the server, the update successful response indicating that the server successfully updated the version identifier of the data resource; or
   receiving a restore command communicated by the server, and updating the page displayed by the browser based at least in part on a backed up version of a data resource comprised in the restore command, the backed up version of the data resource comprised in the restore command corresponding to a data resource obtained by the server in connection with the data resource update request being denied.

9. The method of claim 1, wherein the applying the update to the page comprises:
   in response to obtaining a local update event, updating local content of the page displayed by the browser based at least in part on the local update event and the updated data resource.

10. The method of claim 9, wherein the updating of the local content of the page comprises:
    performing a local refresh of the page with respect to local content of the page instructed in the local update event, wherein the local refresh is invoked through a JavaScript operation of a Document Object Model (DOM) interface.

11. The method of claim 9, wherein one or more local update events occur, and one local update event is used to instruct performance of a refresh of specified local content comprised in the page.

12. The method of claim 1, wherein the data resource comprises one or more page elements and/or one or more code segments.

13. The method of claim 1, wherein the applying the update to the page displayed by the browser includes refreshing display of the page with at least the updated data resource.

14. The method of claim 1, wherein the subcomponent of the webpage includes an element or program code segment of the webpage.

15. The method of claim 14, wherein the element of the webpage includes one or more of text of the webpage, an image to be displayed on the webpage, an audio file embedded in the webpage, an animation to be displayed on the webpage, and a video file embedded in the webpage.

16. The method of claim 1, wherein the data resource is an object or element used by an application module or a file corresponding to the app.

17. The method of claim 1, wherein a granularity of the data resource is smaller than a granularity of an application module or file.

18. A method, comprising:
for individual data resources in a plurality of data resources included in an application (app), determining by one or more processors associated with a server, that a data resource of the plurality of data resources is updated, wherein the data resource is a subcomponent of a webpage;
communicating, by one or more processors associated with the server, the data resource to a terminal, wherein the data resource corresponds to an updated data resource and causes the terminal to apply an update to a page displayed by a browser of the terminal based at least in part on the updated data resource, wherein:
to apply, based at least in part on the updated data resource, the update to the page displayed by the browser comprises invoking an update to a layout for a first part of the page corresponding to the updated data resource, and performing a page rendering of the first part of the page; and
the update to the page is invoked without correspondingly updating a layout of a second part of the page or without correspondingly rendering the second part of the page; and
the first part of the page corresponds to the updated data resource, and the second part of the page does not correspond to the updated data resource; and
the updated data resource includes a line number or offset indicating a location of the data resource to be updated;
receiving a data resource update request sent by the terminal, and, based at least in part on the data resource update request, returning an update successful response or a restore command that comprises a backed up version of the data resource to the terminal, wherein the update successful response indicates that the server has successfully updated a version identifier of the data resource based at least in part on the data resource update request, and the backed up version of the data resource comprised in the restore command corresponds to a version of the data resource obtained by the server in connection with the data resource update request being denied; and
receiving, from the terminal, an indication of whether the update to the page is successful in response to the terminal applying the update to the page.

19. The method of claim 18, further comprising:
determining that the indication of whether the update to the page is successful comprises page update failure information communicated by the terminal; wherein, the page update failure information is communicated to the server in connection with a failure to update the page displayed by the browser based at least in part on the updated data resource; and
obtaining the backed up version of the data resource based at least in part on the page updated failure information, and communicating the backed up version of the data resource to the terminal.

20. The method of claim 18, further comprising:
sending local update events to the terminal, wherein in response to receiving the local update events, the terminal updates local content of the page displayed by the browser based at least in part on the local update events and the updated data resource.

21. The method of claim 20, wherein one or more local update events occur and one local update event is used in connection with instructing a refresh of specified local content comprised in the page.

22. The method of claim 18, wherein the data resource comprises one or more page elements and/or one or more code segments.

23. A terminal, comprising:
one or more processors configured to:
for individual data resources in a plurality of data resources included in an application (app), determine that a data resource of the plurality of data resources is updated, wherein the data resource is a subcomponent of a webpage;
in response to determining that the data resource is updated:
obtain an updated data resource; and
apply an update to a page displayed by a browser on the terminal, wherein:
to apply, based at least in part on the updated data resource, the update to the page displayed by the browser comprises invoking an update to a layout for a first part of the page, and performing a page rendering of the first part of the page;
the update to the page is invoked without correspondingly updating a layout of a second part of the page or without correspondingly rendering the second part of the page;
the first part of the page corresponds to the updated data resource, and the second part of the page does not correspond to the updated data resource;
the data resource is used in connection with the page being rendered; and
the updated data resource includes a line number or offset indicating a location of the data resource to be updated; and
in response to the update being applied to the page, communicate an indication of whether the update to the page is successful, the indication being communicated to a server from which the terminal obtained the updated data resource; and
one or more memories coupled to the one or more processors, configured to provide the one or more processors with instructions.

24. A computer program product, the computer program product being embodied in a non-transitory computer readable storage medium and comprising computer instructions for:
for individual data resources in a plurality of data resources included in an application (app), determining, by one or more processors associated with a terminal, that a data resource of the plurality of data resources is updated, wherein the data resource is a subcomponent of a webpage;
in response to determining that the data resource is updated:

obtaining, by the one or more processors, an updated data resource; and applying, based at least in part on the updated data resource, an update to a page displayed by a browser on the terminal, wherein:

the applying the update to the page displayed by the browser comprises invoking an update to a layout for a first part of the page, and performing a page rendering of the first part of the page;

the update to the page is invoked without correspondingly updating a layout of a second part of the page or without correspondingly rendering the second part of the page;

the first part of the page corresponds to the updated data resource, and the second part of the page does not correspond to the updated data resource;

the updated data resource is used in connection with the page being rendered; and the updated data resource includes a line number or offset indicating a location of the data resource to be updated; and in response to applying the update to the page, communicating, by the one or more processors, an indication of whether the update to the page is successful, the indication being communicated to a server from which the terminal obtained the updated data resource.

25. A server, comprising:

one or more processors configured to:

for individual data resources in a plurality of data resources included in an application (app), determine that a data resource of the plurality of data resources is updated, wherein the data resource is a subcomponent of a webpage;

communicate the data resource to a terminal, wherein the data resource corresponds to an updated data resource and causes the terminal to apply an update to a page displayed by a browser of the terminal based at least in part on the updated data resource, wherein:

to apply, based at least in part on the updated data resource, the update to the page displayed by the browser comprises invoking an update to a layout for a first part of the page, and performing a page rendering of the first part of the page; and the update to the page is invoked without correspondingly updating a layout of a second part of the page or without correspondingly rendering the second part of the page; and the first part of the page corresponds to the updated data resource, and the second part of the page does not correspond to the updated data resource; and the updated data resource includes a line number or offset indicating a location of the data resource to be updated;

receive a data resource update request sent by the terminal, and, based at least in part on the data resource update request, return an update successful response or a restore command that comprises a backed up version of the data resource to the terminal, wherein the update successful response indicates that the server has successfully updated a version identifier of the data resource based at least in part on the data resource update request, and the backed up version of the data resource comprised in the restore command corresponds to a version of the data resource obtained by the server in connection with the data resource update request being denied; and receive, from the terminal, an indication of whether the update to the page is successful in response to the terminal applying the to the page; and one or more memories coupled to the one or more processors, configured to provide the one or more processors with instructions.

26. A computer program product, the computer program product being embodied in a non-transitory computer readable storage medium and comprising computer instructions for:

for individual data resources in a plurality of data resources included in an application (app), determining by one or more processors associated with a server, that a data resource of the plurality of data resources is updated, wherein the data resource is a subcomponent of a webpage;

communicating, by one or more processors associated with a server, the server, the data resource to a terminal, wherein the data resource corresponds to an updated data resource and causes the terminal to apply an update to a page displayed by a browser of the terminal based at least in part on the updated data resource, wherein:

to apply, based at least in part on the updated data resource, the update to the page displayed by the browser comprises invoking an update to a layout for a first part of the page, and performing a page rendering of the first part of the page; and the update to the page is invoked without correspondingly updating a layout of a second part of the page or without correspondingly rendering the second part of the page; and the first part of the page corresponds to the updated data resource, and the second part of the page does not correspond to the updated data resource; and the updated data resource includes a line number or offset indicating a location of the data resource to be updated;

receiving a data resource update request sent by the terminal, and, based at least in part on the data resource update request, returning an update successful response or a restore command that comprises a backed up version of the data resource to the terminal, wherein the update successful response indicates that the server has successfully updated a version identifier of the data resource based at least in part on the data resource update request, and the backed up version of the data resource comprised in the restore command corresponds to a version of the data resource obtained by the server in connection with the data resource update request being denied; and receiving, from the terminal, an indication of whether the update to the page is successful in response to the terminal applying the update to the page.

\* \* \* \* \*

UNITED STATES PATENT AND TRADEMARK OFFICE
CERTIFICATE OF CORRECTION

PATENT NO. : 11,055,085 B2
APPLICATION NO. : 16/041082
DATED : July 6, 2021
INVENTOR(S) : Fengyuan Wu et al.

Page 1 of 1

It is certified that error appears in the above-identified patent and that said Letters Patent is hereby corrected as shown below:

In the Specification

In Column 3, Line(s) 24, delete "HIVID" and insert --HMD--, therefor.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*